United States Patent
Friedman

(10) Patent No.: US 9,659,277 B2
(45) Date of Patent: May 23, 2017

(54) SYSTEMS AND METHODS FOR IDENTIFYING POTENTIALLY INACCURATE DATA BASED ON PATTERNS IN PREVIOUS SUBMISSIONS OF DATA

(75) Inventor: Kurt L. Friedman, Burlington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 312 days.

(21) Appl. No.: 13/117,409

(22) Filed: May 27, 2011

(65) Prior Publication Data
US 2012/0303389 A1   Nov. 29, 2012

(51) Int. Cl.
*G06Q 10/10* (2012.01)
*G06Q 30/02* (2012.01)
*G06Q 40/00* (2012.01)
*G06Q 40/08* (2012.01)
*G06Q 40/02* (2012.01)

(52) U.S. Cl.
CPC ............ *G06Q 10/10* (2013.01); *G06Q 30/02* (2013.01); *G06Q 40/00* (2013.01); *G06Q 40/08* (2013.01); *G06Q 40/02* (2013.01)

(58) Field of Classification Search
CPC ........ G06Q 40/08; G06Q 10/10; G06Q 30/02; G06Q 40/00; G06Q 40/02; G06F 17/30
USPC ........... 705/1, 2, 4, 9, 10, 14.25, 37, 35, 38; 707/999.104, 999.107; 1/1; 345/419
See application file for complete search history.

(56) References Cited

U.S. PATENT DOCUMENTS

| | | | | |
|---|---|---|---|---|
| 4,831,526 A | * | 5/1989 | Luchs | G06Q 40/08 705/4 |
| 7,203,734 B2 | * | 4/2007 | Rudy | G06Q 30/06 705/26.1 |
| 8,260,634 B1 | * | 9/2012 | Lawlor | G06Q 10/10 705/2 |

(Continued)

FOREIGN PATENT DOCUMENTS

| | | | | |
|---|---|---|---|---|
| WO | WO 02/093293 | * | 11/2002 | |
| WO | WO 03/009175 | * | 1/2003 | G06F 17/30 |

OTHER PUBLICATIONS

Ginger Wooster, An LIS supports quality initiatives. Product Focus. Apr. 2008. pp. 50 & 53 www.mlo-online.com.*

(Continued)

*Primary Examiner* — Barbara Joan Amelunxen
(74) *Attorney, Agent, or Firm* — Howard IP Law Group, PC

(57) ABSTRACT

According to some embodiments, a system may receive, from a remote insurance submitter, insurance data submitted via an electronic quoting and submission system in connection with behavioral data associated with the submitter. A processor may then automatically analyze the submitted insurance data based at least in part on information stored in a historic underwriting analytics database and the behavioral data associated with the submitter. Potentially inaccurate insurance data submitted by the insurance submitter may then be identified based on the analysis. According to some embodiments, a plurality of potentially inaccurate insurance data values may be used to flag the submitted insurance data, the insurance submitter, one or more input portions of the electronic quoting and submission system, and/or an insurance class of business.

24 Claims, 11 Drawing Sheets

(56) References Cited

U.S. PATENT DOCUMENTS

| | | | | |
|---|---|---|---|---|
| 8,458,062 | B2* | 6/2013 | Dutt | G06Q 30/08 705/35 |
| 8,756,082 | B1* | 6/2014 | Madeyski | G06Q 30/02 705/37 |
| 2001/0034621 | A1* | 10/2001 | Kirsh | G06Q 10/10 705/4 |
| 2002/0052836 | A1* | 5/2002 | Galperin | G06Q 40/02 705/38 |
| 2004/0019609 | A1* | 1/2004 | Orton, III | G06Q 10/10 |
| 2004/0122726 | A1* | 6/2004 | Linde | G06Q 10/06393 705/7.33 |
| 2004/0128182 | A1* | 7/2004 | Pepoon | G06Q 40/08 705/4 |
| 2004/0172310 | A1* | 9/2004 | Atlee | G06F 17/243 705/4 |
| 2004/0249650 | A1* | 12/2004 | Freedman | G06Q 30/02 705/7.29 |
| 2004/0249745 | A1* | 12/2004 | Baaren | G06Q 20/10 705/39 |
| 2005/0027572 | A1* | 2/2005 | Goshert | G06Q 40/08 705/4 |
| 2005/0114253 | A1* | 5/2005 | Low | G06Q 40/04 705/37 |
| 2006/0020509 | A1* | 1/2006 | Strain | G06Q 10/109 705/14.25 |
| 2006/0047540 | A1* | 3/2006 | Hutten | G06Q 40/08 705/4 |
| 2006/0136274 | A1* | 6/2006 | Olivier | G06Q 40/00 705/4 |
| 2007/0094041 | A1* | 4/2007 | Coale | G06F 3/04815 345/419 |
| 2007/0124238 | A1* | 5/2007 | Hogg | G06Q 20/04 705/38 |
| 2007/0250382 | A1* | 10/2007 | Beck | G06Q 30/00 705/14.21 |
| 2008/0162487 | A1* | 7/2008 | Richter | G06Q 10/00 |
| 2009/0024273 | A1* | 1/2009 | Follmer | G06Q 10/10 701/33.4 |
| 2009/0157489 | A1* | 6/2009 | Leman | G06Q 40/08 705/35 |
| 2009/0182585 | A1* | 7/2009 | Harkensee | G06Q 10/087 705/4 |
| 2009/0292589 | A1* | 11/2009 | Marsh | G06Q 10/06393 705/7.39 |
| 2010/0205012 | A1* | 8/2010 | McClellan | G06Q 40/08 705/4 |
| 2010/0223078 | A1* | 9/2010 | Willis | G06Q 40/08 705/4 |
| 2011/0040582 | A1* | 2/2011 | Mullins | G06Q 40/08 705/4 |
| 2011/0225031 | A1* | 9/2011 | Park | G06Q 30/02 705/14.25 |
| 2012/0016693 | A1* | 1/2012 | Haywood | G06Q 40/08 705/4 |
| 2012/0166229 | A1* | 6/2012 | Collins | G06Q 40/08 705/4 |
| 2012/0173290 | A1* | 7/2012 | Collins | G06Q 40/08 705/4 |
| 2012/0239438 | A1* | 9/2012 | Hemmings | G06Q 40/08 705/4 |
| 2012/0284061 | A1* | 11/2012 | Collins | G06Q 40/08 705/4 |
| 2012/0317081 | A1* | 12/2012 | Duvvoori | G06F 17/30303 707/692 |
| 2012/0317593 | A1* | 12/2012 | Myslinski | G06Q 10/10 725/14 |

OTHER PUBLICATIONS

Donna Fluss, How QM Recording is changing for the better. International Customer Management Institute (ICMI). Call Center Magazine, Feb. 2005. pp. 1-9.*

Wooester, Ginger, An LIS supports quality initiatives, Product Focus, MLO, Apr. 2008 (pp. 50-51), www.mlo-online.com.*

\* cited by examiner

| POLICY IDENTIFIER 902 | AGENT ID 904 | INSURANCE CATEGORY 906 | BUSINESS CLASSIFICATION 908 | FLAG 910 |
|---|---|---|---|---|
| P101 | A101 | SMALL BUSINESS | OTHER | OVERUSE OF OTHER CLASSIFICATION |
| P102 | A101 | SMALL BUSINESS | OTHER | OVERUSE OF OTHER CLASSIFICATION |
| P103 | A101 | SMALL BUSINESS | OTHER | OVERUSE OF OTHER CLASSIFICATION |
| P104 | A102 | SMALL BUSINESS | CONSTRUCTION | NONE |
| P105 | A103 | SMALL BUSINESS | OTHER | NONE |
| P106 | A104 | AUTOMOTIVE | CONSTRUCTION | RE-SUBMITTED FLEET AGE FOUR TIMES |
| P107 | A015 | AUTOMOTIVE | CONSTRUCTION | TOO MANY CLEAR MVRS |

FIG. 9

| INSURANCE PARAMETER 1102 | FLAG RATE 1104 | AREAS OF CONCERN 1106 | TREND ANALYSIS 1108 | MODELING INFORMATION 1110 |
|---|---|---|---|---|
| PAR_101 | 1% | OVERUSE OF "OTHER" CLASSIFICATION | STEADY | USE (WEIGHT .3) |
| PAR_102 | 1% | TOO MANY RE-SUBMISSIONS | STEADY | USE (WEIGHT .5) |
| PAR_103 | 5% | OVERUSE OF "N/A" CLASSIFICATION | INCREASING | DO NOT USE, REVIEW QUESTION WORDING |
| PAR_104 | 3% | HOUSING AGE | STEADY | USE (WEIGHT .1) |
| PAR_105 | 2% | TOO MANY CLEAR MVRS | STEADY | USE (WEIGHT .1) |

FIG. 11

SYSTEMS AND METHODS FOR IDENTIFYING POTENTIALLY INACCURATE DATA BASED ON PATTERNS IN PREVIOUS SUBMISSIONS OF DATA

BACKGROUND

An insurance agent may submit insurance information to an insurance provider. For example, an insurance agent may submit a request for a quote or an insurance policy in connection with a commercial small business owner's insurance policy. The submitted information might include, for example, a business name and address, a business classification (e.g., indicating that the business is primarily associated with "office" or "construction" work), and a number of employees currently working for the business. The insurance provider might then use the submitted insurance information in connection with an underwriting process to generate a quote for a proposed insurance policy and/or to approve a request for a previously quoted insurance policy.

In some cases, however, inaccurate insurance data might be submitted by an insurance agent. For example, an insurance agent might frequent classify a business as primarily being associated with "office" work when other, more specific, classifications might be available and appropriate (e.g., perhaps the agent should have specified that the business was more accurately described as a "employment agency" or "medical office"). Such inaccurate information could lead an insurance provider to improperly generate quotes and/or approvals of insurance policy applications. Moreover, these difficulties may only increase as the number of insurance agents associated with an insurance provider grows.

It would therefore be desirable to provide systems and methods to efficiently and accurately detect potentially inaccurate insurance data submitted by an insurance agent.

SUMMARY OF THE INVENTION

According to some embodiments, systems, methods, apparatus, computer program code and means may be provided to efficiently and accurately detect potentially inaccurate insurance data submitted by an insurance agent. In some embodiments, insurance data may be received from a remote insurance submitter via an electronic quoting and submission system in connection with behavioral data associated with the submitter. The submitted insurance data may then be automatically analyzed based at least in part on information stored in a historic underwriting analytics database and the behavioral data associated with the submitter. Based on the analysis, potentially inaccurate insurance data submitted by the insurance submitter may be identified and/or flagged for further processing.

Some embodiments comprise: means for receiving, from a remote insurance submitter, insurance data submitted via an electronic quoting and submission system in connection with behavioral data associated with the submitter; means for automatically analyzing, by a processor, the submitted insurance data based at least in part on information stored in a historic underwriting analytics database and the behavioral data associated with the submitter; and means for identifying, by the processor based on the analysis, potentially inaccurate insurance data submitted by the insurance submitter.

A technical effect of some embodiments of the invention is may be an improved and computerized method of performing an underwriting process. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 9 is a tabular portion of a submitted data database according to some embodiments.

FIG. 11 is a tabular portion of a historic database according to some embodiments.

DETAILED DESCRIPTION

An insurance "agent" may submit insurance information to an insurance provider or a service associated with multiple insurance providers. As used herein, the term "agent" might refer to, for example, a licensed or registered person authorized to sell insurance products. The term agent might also refer to any of a broker, a registered independent agent, a producer, an entity (e.g., an agency), an insurance provider, a sales representative and/or an employee or affiliate of an agent. Moreover, any of the actions described here might be performed by a device associated with an agent (e.g., his or her laptop computer or smartphone).

It should also be understood also that an insurance agent or agency may offer some or all of the products in any of the insurance categories described herein. Note that an insurance "agency" might be associated with an office where an agent operates alone, or may instead be associated with an office having multiple producers licensed to sell insurance. According to some embodiments, these licensed producers within an agency could also be associated the system and methods described herein. In some cases, the producers may be licensed to sell different types of insurance products, might have different areas of expertise, needs, etc. Thus, an insurance "agent" might refer to one who is appointed by an insurance agency to sell products on its behalf, or may be licensed producers within an insurance agency.

In some cases, an insurance agent may be associated with only a single insurance provider (sometimes referred to as a "captive" insurance agent). In other cases, an "independent" insurance agent may be associated with several different insurance providers. Note that embodiments described herein may be associated with either captive or independent insurance agents. With respect to independent insurance agents, any of the elements described herein may be further based on or otherwise associated with an insurance provider identifier. For example, the detection of potentially inaccurate insurance information might be based at least in part on an insurance provider identifier.

Figure 1:
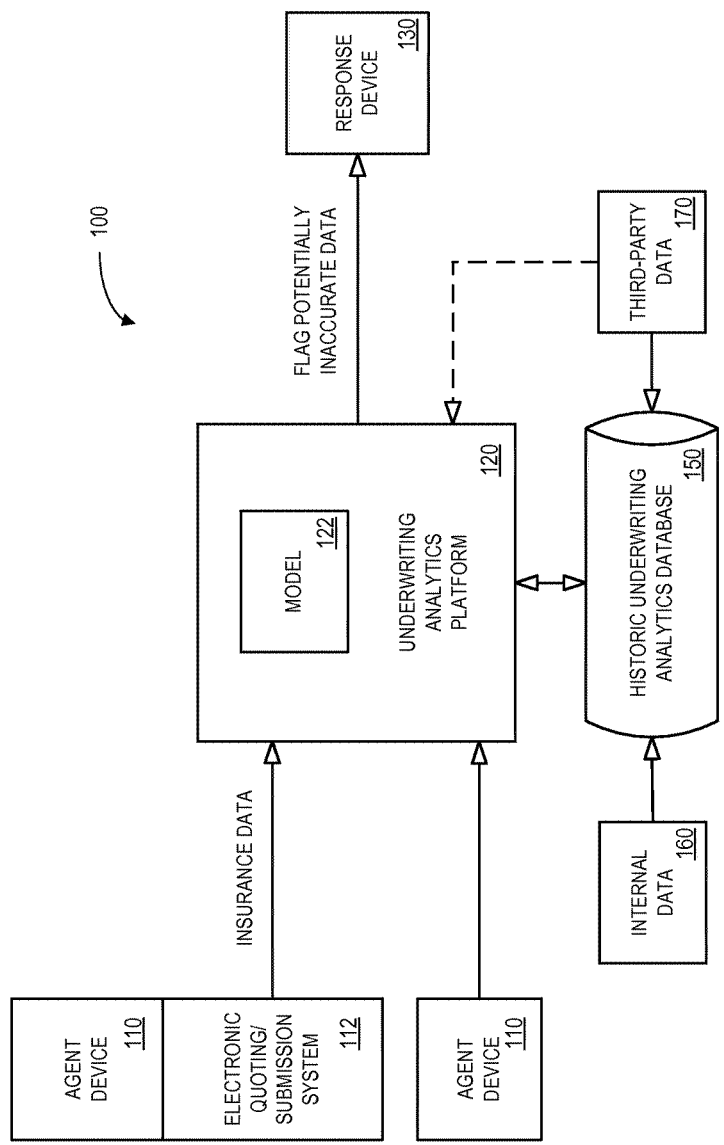
FIG. 1 is block diagram of a system according to some embodiments of the present invention.

FIG. 1 is block diagram of a system 100 according to some embodiments of the present invention. In particular, agent devices 110 associated with insurance agents may submit insurance information to an underwriting analytics platform 120 associated with an insurance provider. According to some embodiments, the agent devices 110 may submit insurance information to the underwriting analytics platform 120 via an electronic quoting and submission system 112. As used herein, the electronic quoting and submission system 112 may comprise any ways in which an agent may submit insurance information to an insurance provider, including, for example, a web based submission process. Although many embodiments described herein are associated with an insurance agent submitting insurance data to the platform 120, note that embodiments may be associated with other types of submitters or requesters. For example, a party entering information on behalf of an insurance agent or a potential insurance customer might submit insurance data to the platform 120.

The agent devices 110 might comprise, for example, Personal Computers (PCs), laptop computers, and/or wireless telephones that can transmit insurance data to the underwriting analytics platform 120. By way of examples, an agent device 110 might be associated with an agent's office, vehicle, or smartphone.

According to some embodiments, the "automated" underwriting analytics platform 120 may flag potentially inaccurate insurance data. As used herein, the term "automated" may refer to, for example, actions that can be performed with little or no human intervention. By way of example only, the underwriting analytics platform 120 may be associated and/or communicate with a PC, an enterprise server, or a database farm. According to some embodiments, the underwriting analytics platform 120 is associated with an insurance provider or a number of different insurance providers. Moreover, according to some embodiments, a model 122 (e.g., a multi-dimensional and/or weighted model looking for outlying behaviors) at the platform 120 may facilitate the identification of key indicators and/or potentially inaccurate insurance data.

As used herein, devices including those associated with the underwriting analytics platform 120, and any other device described herein may exchange information via any communication network (not illustrated in FIG. 1) which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Note that the underwriting analytics platform 120 may be associated with various types of insurance policies, including personal insurance, business insurance, workers compensation, liability insurance, and wealth management offerings, including property and casualty insurance, life insurance, retirement and education investment products, and group benefits offerings.

Although a single underwriting analytics platform 120 is shown in FIG. 1, any number of such devices may be included. Moreover, various devices described herein might be combined according to embodiments of the present invention. For example, in some embodiments, the underwriting analytics platform 120 and a historic underwriting analytics database 150 might be co-located and/or may comprise a single apparatus. Moreover, according to some embodiments, internal data 160 (e.g., data generated by internal audits) and/or third-party data 170 (e.g., Experian or similar information) may be used to supplement the information in the historic underwriting analytics database 150. Note that the internal data 160 and/or third-party data 170 might also be provided directly to the platform 120 and/or model 122 (e.g., as illustrated by the dashed arrow in FIG. 1).

An insurance agent may submit a request for a quote or an insurance policy to the underwriting analytics platform 120 in connection with a commercial small business owner's insurance policy. The submitted information might include, for example, a business name and address, a business classification (e.g., indicating that the business is primarily associated with "office" or "construction" work), and a number of employees currently working for the business. The insurance provider might then use the submitted insurance information in connection with an underwriting process to generate a quote for a proposed insurance policy and/or to approve a request for a previously quoted insurance policy.

In some cases, however, inaccurate insurance data might be submitted by an insurance agent. For example, an insurance agent might frequently classify a business as primarily being associated with "office" work when other, more specific, classifications might be available and appropriate (e.g., perhaps the agent should have specified that the business was more accurately described as an "employment agency" or "medical office"). Such inaccurate information could lead an insurance provider to improperly generate quotes and/or approvals of insurance policy applications.

It would therefore be desirable to provide systems and methods to efficiently and accurately detect potentially inaccurate insurance data submitted by an insurance agent. According to some embodiments, the underwriting analytics platform 120 and or the model 122 may access information in the historic underwriting analytics database 150 to generate a signal that flags potentially inaccurate data. The flag might be provided to, for example, a response device 130 associated with an administrator who may then decide to investigate the submitted insurance data more closely.

Figure 2:
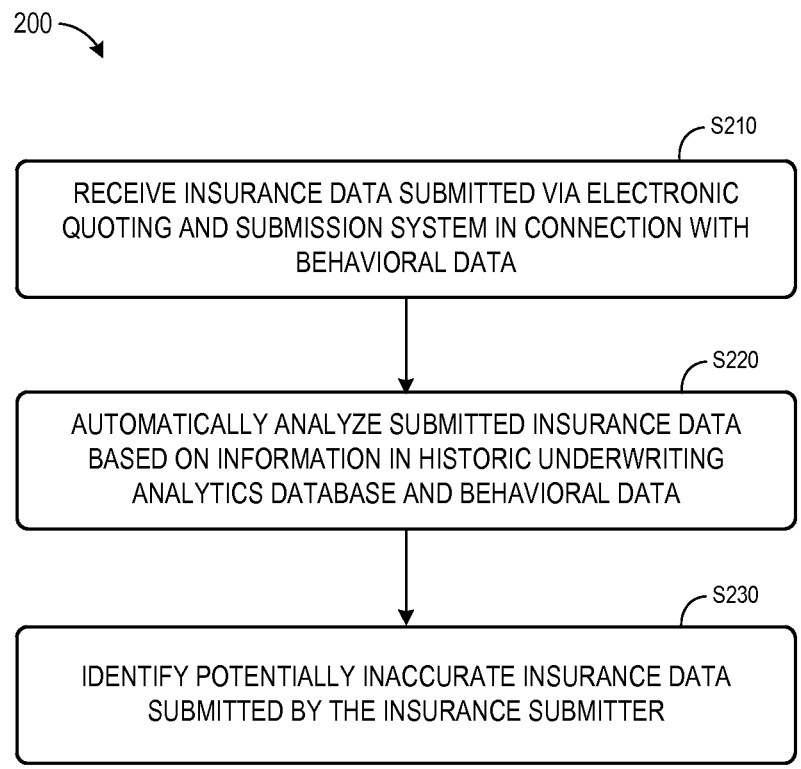
FIG. 2 illustrates a method according to some embodiments of the present invention.

For example, FIG. 2 illustrates a process 200 that might be performed, for example, by some or all of the elements of the system 200 described with respect to FIG. 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to facilitate the detection of potentially inaccurate insurance information. Pursuant to some embodiments, at S210 an underwriting analytics platform may receive, from a remote insurance submitter, insurance data submitted via an electronic quoting and submission system in connection with behavioral data associated with the submitter. The behavioral data might be, for example, received along with the submitted insurance data. According to some embodiments, the behavioral data may be received prior to the submitted insurance data (e.g., in connection with prior applications received from the insurance agent). The submitted insurance data may be associated with, by way of example only, a commercial small business owner's insurance policy, workers compensation insurance, or commercial automobile insurance. In some cases, the data may be newly received in connection with an insurance policy application being submitted for a quote or approval. In other cases, the data might have been received in the past in connection with a previously issued insurance policy. For example, a batch of data might be reviewed in connection an insurance agent's book of business. As used herein, the term "submitter" might refer to, for example, an insurance agent, an insurance agency, a party entering information on behalf of an insurance agent, and/or a potential insurance customer (e.g., who directly requests an insurance quote via an online submission process). Moreover, the behavioral data associated with the submitter might comprise, for example, a revision to the submitted insurance data (e.g., he or she changed an answer multiple times), a set of answers submitted over a period of time in connection with a number of different insurance policy applications, a set of answers submitted in connection with a single insurance policy application, and/or submitter behavior after an insurance policy application has been submitted or an insurance policy has been issued (e.g., an insurance agent frequently requests endorsements after issuance of an insurance policy).

Figure 3:
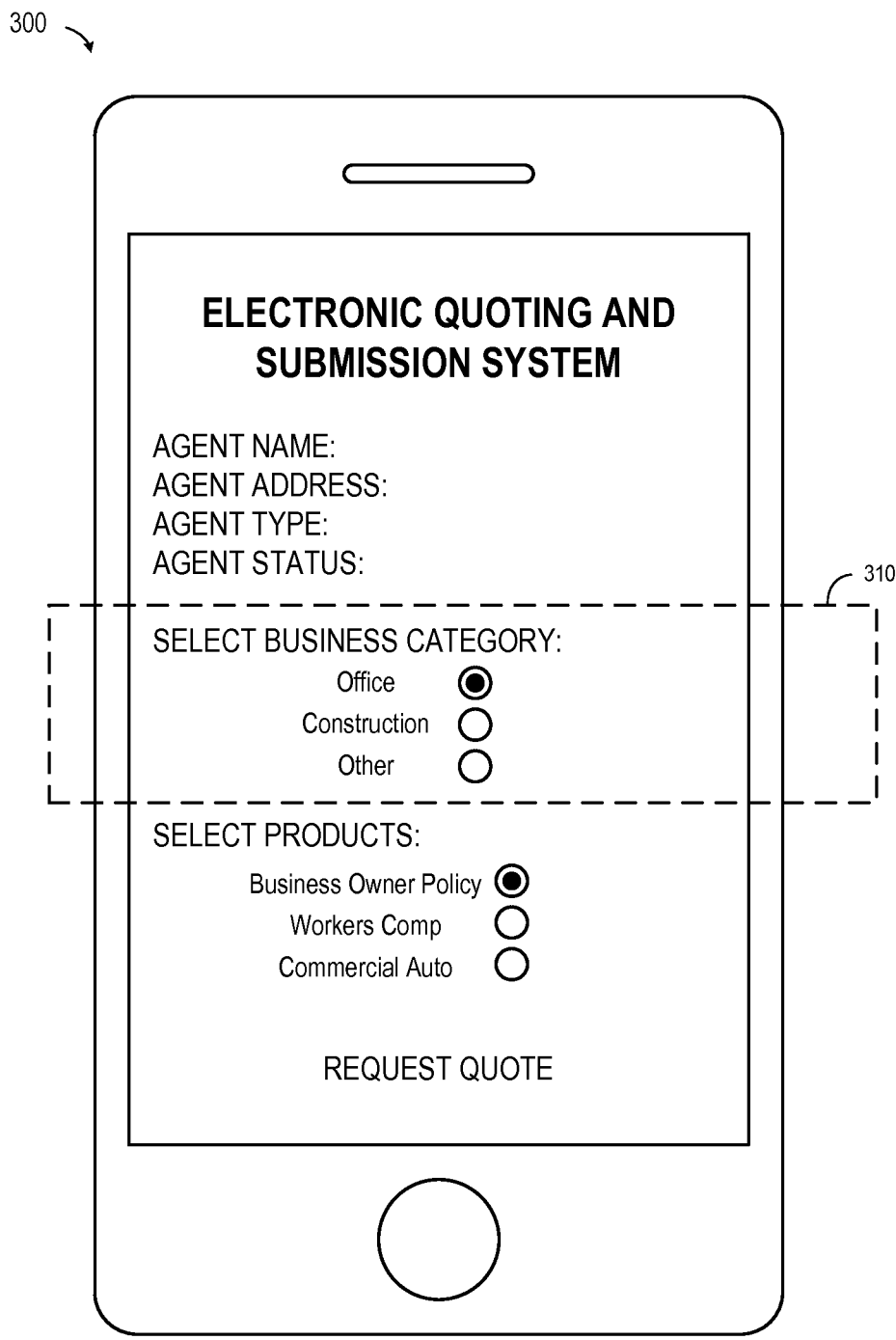
FIG. 3 is an example of an agent electronic quoting and submission system display on a mobile device according to some embodiments.

FIG. 3 is one example of an agent electronic quoting and submission system display 300 on a mobile device according to some embodiments. The mobile device may be any of a number of different types of mobile devices that allow for wireless communication and that may be carried with or by a user. For example, in some embodiments, the mobile device might comprise an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as an underwriting analytics platform or engine.

The agent electronic quoting and submission system display 300 may let the insurance agent submit data to insurance provider in connection with, for example, a request for an insurance quote. For example, the agent might use the display 300 to enter his or her personal information along with answers to questions related to the type of insurance being requested. For example, one input portion 310 might ask the agent to select a business category associated with small business owner's insurance product. The agent might then select a "Request Quote" icon to transmit the information to a remote underwriting analytics platform.

At S220, the underwriting analytics platform may automatically analyze the submitted insurance data based at least in part on information stored in a historic underwriting analytics database and the behavioral data associated with the submitter. The historic underwriting analytics database might store information associated with, for example, one or more key indicators of agent results and behaviors. That is, it might be determined that agents who frequently change answers during an approval process (e.g., in connection with the input portion 310 of FIG. 3) might often provide inaccurate information. Other types of information that might be stored in the historic underwriting analytics database might be associated with, for example: agent profitability, agent large loss information, agent book profile characteristics, an audit team input, and/or a field agency assessment. Still other examples of information that might be stored in the historic underwriting analytics database might include: leading indictors of misinformation, agency profile data, backdating history, policy cancellation and declination information, classification data, endorsement activity, exposure discrepancy, hard stop overrides, large loss and unacceptable risk values, pricing data, and/or risk alerts.

At S230, the underwriting analytics platform may identify, based on the analysis, potentially inaccurate insurance data that was submitted by the insurance submitter. In some cases, for example, information about a plurality of potentially inaccurate insurance data values are used to flag the submitted insurance data (e.g., in connection with that particular insurance policy application). As another example, information about a plurality of potentially inaccurate insurance data values might instead be used to flag an insurance class of business (e.g., in connection with all construction insurance policies in a particular geographic location).

According to some embodiments, information about a plurality of potentially inaccurate insurance data values is used to flag the insurance agent who submitted the data. For example, the flag might be generated based on a rule threshold associated with hard stops, exposures, pricing, classification changes, declination or cancellation rates, and/or large loss rates associated with a particular insurance agent or agency.

According to still other embodiments, the electronic quoting and submission system includes a plurality of input portions, and data about a plurality of potentially inaccurate insurance data values are used to flag at least one of the input portions. Consider, for example, the input portion 310 of FIG. 3. In that example, the input portion might comprise a Standard Industrial Classification ("SIC") code question or selection. If a large number of agents improperly select SIC codes on a regular basis, an insurance provider might consider re-wording the question and/or providing further help in the User Interface (UI).

According to some embodiments, a recommendation may be transmitted in connection with the flag. The recommendation might be associated with, for example: an indication that no action is required, an audit recommendation, a monitor status, an increase in a quality assurance process, a verbal or written warning, a training plan, an action plan, a financial penalty, a restricted pricing status, and/or a relationship termination. According to some embodiments, a queue of recommendations might be maintained (e.g., and the recommendations might be executed on a first-in, first-out basis or any other order).

Figure 4:
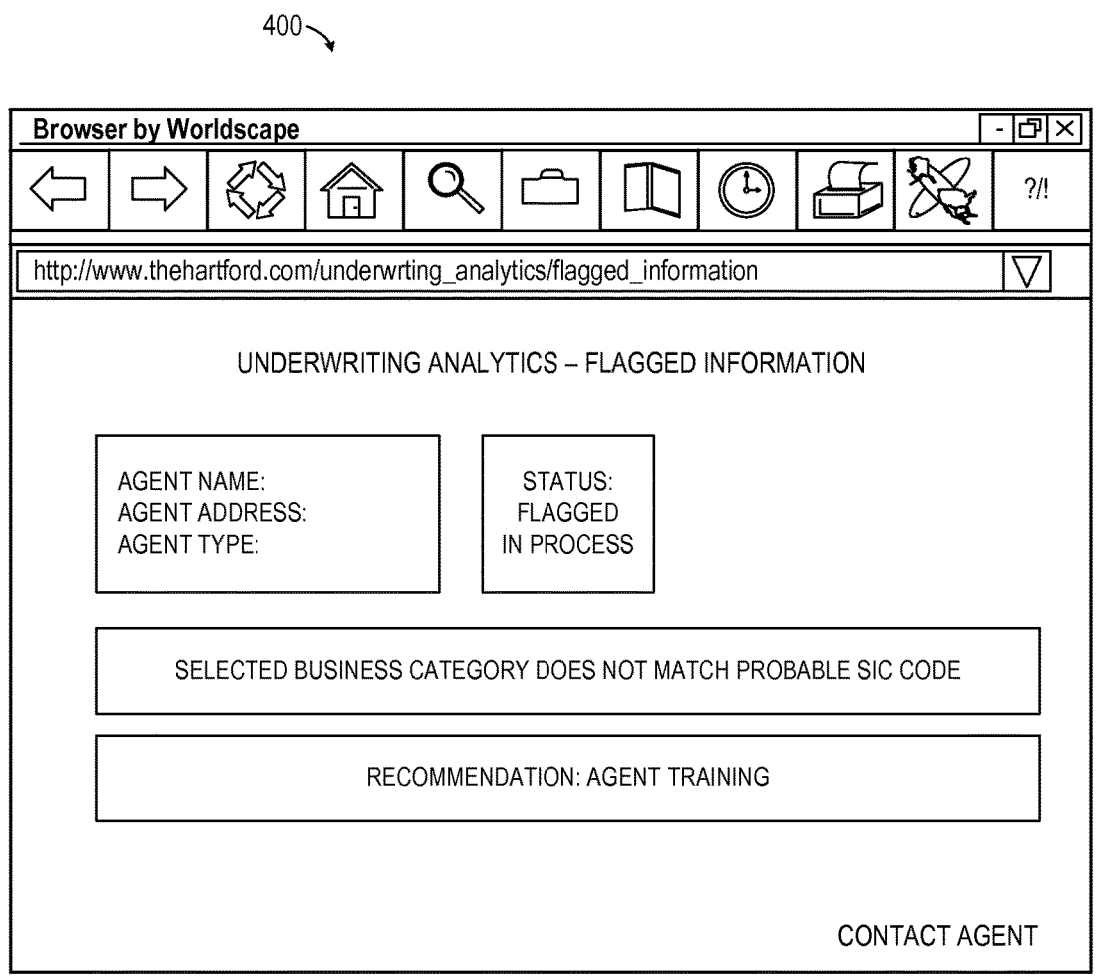
FIG. 4 is an example of an underwriting analytics display in accordance with some embodiments.

FIG. 4 is an example of an underwriting analytics display 400 in accordance with some embodiments. In this example, an insurance agent has been flagged for selecting a business category that does not match the probable SIC code (e.g., as determined based on information received from a third party service, such as Experian®). Moreover, the display 400 indicates that further agent training is recommended to correct the situation. According to some embodiments, the display might further indicate: a current status, an analysis in process, a monitor status, an open status, a delivered recommendation, an in progress recommendation, and/or a complete recommendation. In some cases, the information in a historic underwriting analytics database might be used in substantially real time to flag potentially inaccurate insurance data as it is being submitted. In other cases, information in a historic underwriting analytics database might be analyzed to try to determine which characteristics and/or data values might be helpful in connection with flagging future insurance data submissions.

Figure 5:
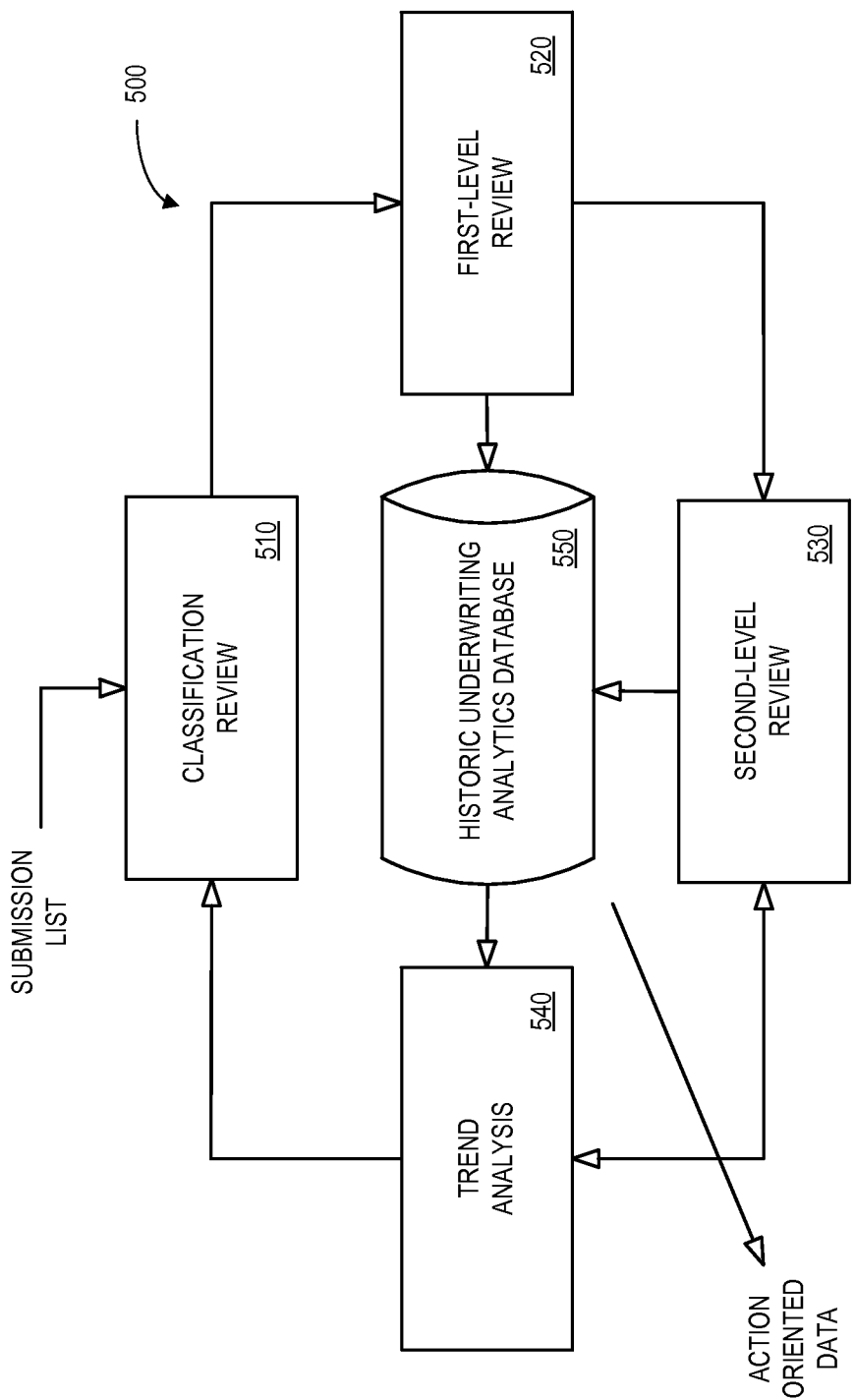
FIG. 5 illustrates the update and/or use of a historic underwriting analytics database according to another embodiment of the present invention.

According to some embodiments, an analysis may be periodically performed on the information stored in the historic underwriting analytics database to determine a trigger, an unusual distribution or frequency of negative attributes, a rule, a tolerance, and/or a threshold. For example, FIG. 5 illustrates an update and/or use scenario 500 of a historic underwriting analytics database 550 in connection with business codes (e.g., SIC values) according to another embodiment of the present invention. In this case, an initial classification review 510 might be performed on a submission list (e.g., a weekly list of insurance codes submitted by agents). The initial classification review 510 might be, for example, an automated process and/or a manual comparison of the submitted data with other information, such as SIC codes provided by Experian®.

When a potential inaccuracy is found, it might be forwarded to a first-level review process 520 to determine if a simple explanation can be found for the difference (e.g., involving a check of a web site of the business requesting insurance to see if the submitted business code seems appropriate). If not, the potential inaccuracy may undergo a second-level review 530 (e.g., involving a telephone call to the business requesting insurance), and, if warranted, an entry may be logged into the historic underwriting analytics database 550. A trend analysis 540 may be performed on information ion the historic underwriting analytics database 550 (e.g., on a continuous or periodic basis) and results may be fed back to the initial classification review 510 and/or second-level review 530 processes.

The information in the historic underwriting analytics database 550 may then be used to generate action oriented data. For example, the action oriented data might indicate that a particular agent needs further training or that a question on an electronic insurance submission should be re-worded or otherwise changed (e.g., changed from a free-form entry to a selection from a list of potential answers). The historic underwriting analytics database 550 might similarly be used in connection with modeling data, scoring data, data mining, outlier identification, weighting factor generation, and/or a recent activity analysis.

Figure 6:
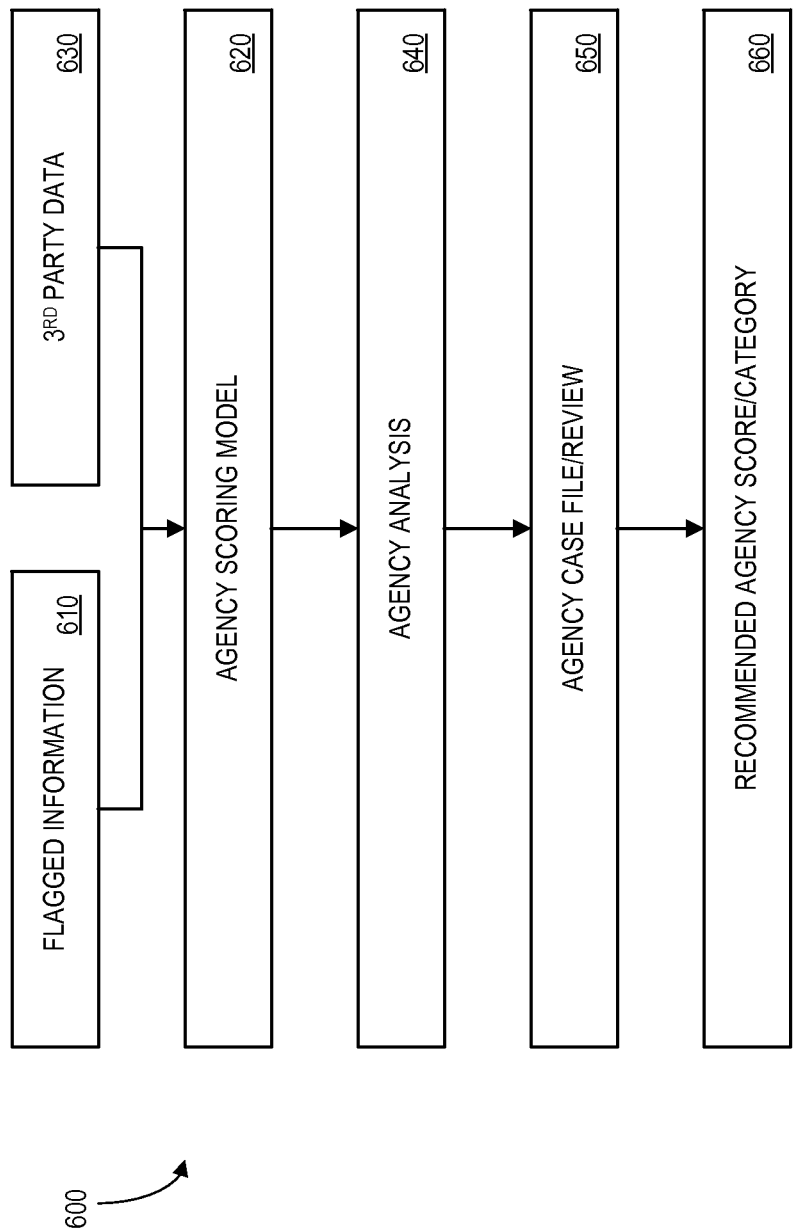
FIG. 6 is a block diagram associated with a recommended agency score/category process according to another embodiment of the present invention.

FIG. 6 is a block diagram associated with a recommended agency score/category process 600 according to another embodiment of the present invention. In particular, flagged information 610 may be fed into an agency scoring model 620 along with third party data 630. The agency scoring model 620 may, for example, perform an agency analysis 640 including the application of one or more rules or models based on information in a historic underwriting analytics database. If warranted, an agency case file/review 650 might be performed to determine a recommended agency score/category 660 for that agent. Note the actions associated with the agency case file/review 650 might vary depending on type of potential inaccuracy that was flagged at 610.

Figure 7:
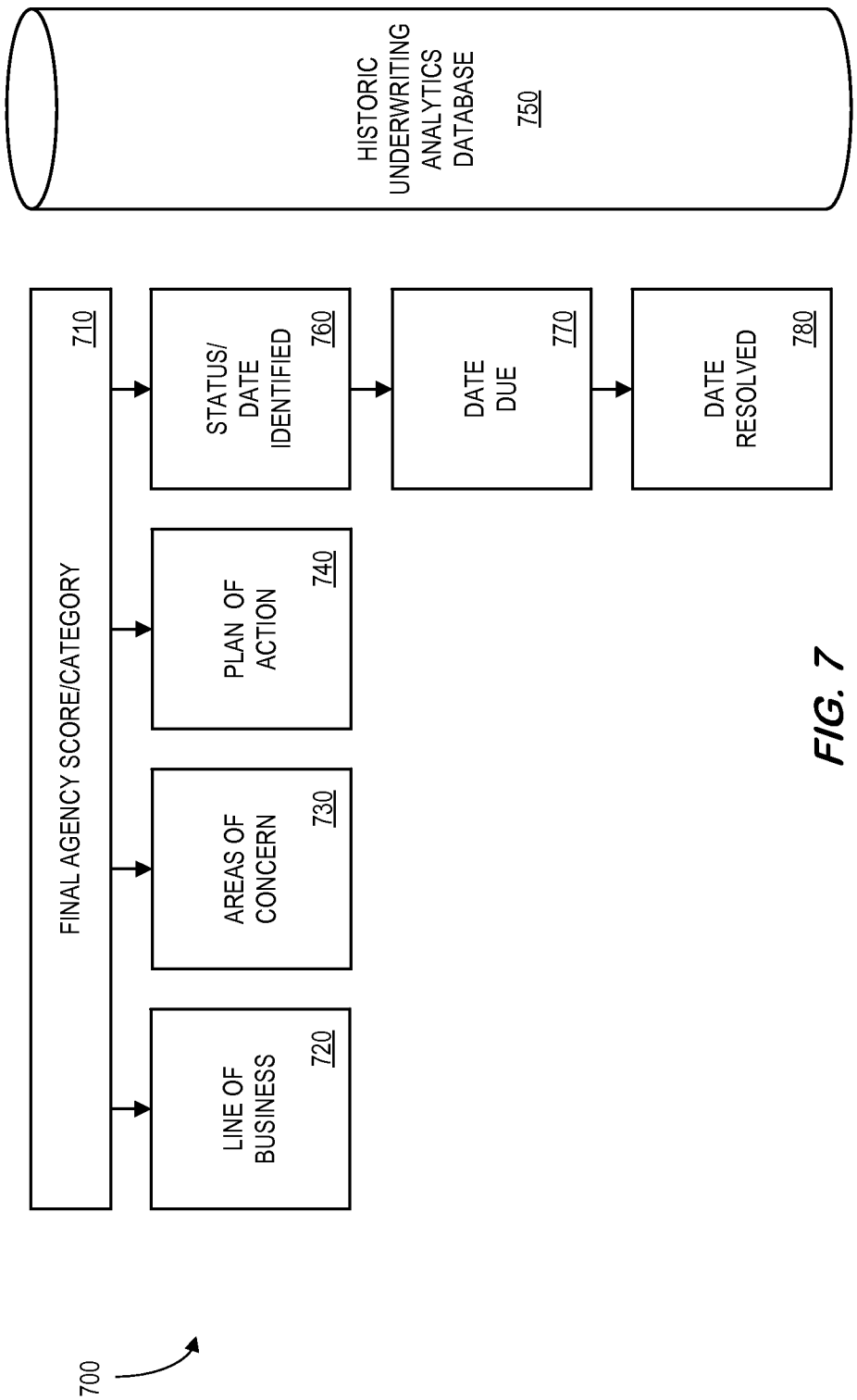
FIG. 7 is block diagram associated with a final agency score/category process according to another embodiment of the present invention.

FIG. 7 is block diagram associated with a final agency score/category process 700 according to another embodiment of the present invention. In this case, a final agency score/category 710 might indicate a line of business 720 (e.g., workers compensation or commercial automobile), the particular areas of concern 730 (e.g., hard stops, exposures, pricing, classification changes, declination and cancellation percentages, and/or large losses), and one or more recommendations of a plan of action 740 for the agent. The plan of action 740 might be based on the severity and/or frequency of errors and could include, for example, no action, an audit, a monitoring of future information from that agent, a verbal or written warning, additional training, and/or restrictions on future business with that agent (possibly including a termination of a relationship).

The plan of action 740 might be associated with a current status (e.g., in process, contested, or completed) and/or a date identified 760. The plan of action 740 may further be associated with a due date 770 and a date resolved 780 (e.g., the date upon which an agent completed his or her supplemental training). All of the final agency score 710, line of business 720, areas of concern 730, plan of action 740, status and date identified 760, due date 770, and date resolved 780 might be stored in a historic underwriting analytics database 750.

As a result of the embodiments described herein, an improved system and method to facilitate detection of potentially inaccurate insurance information may be achieved.

Figure 8:
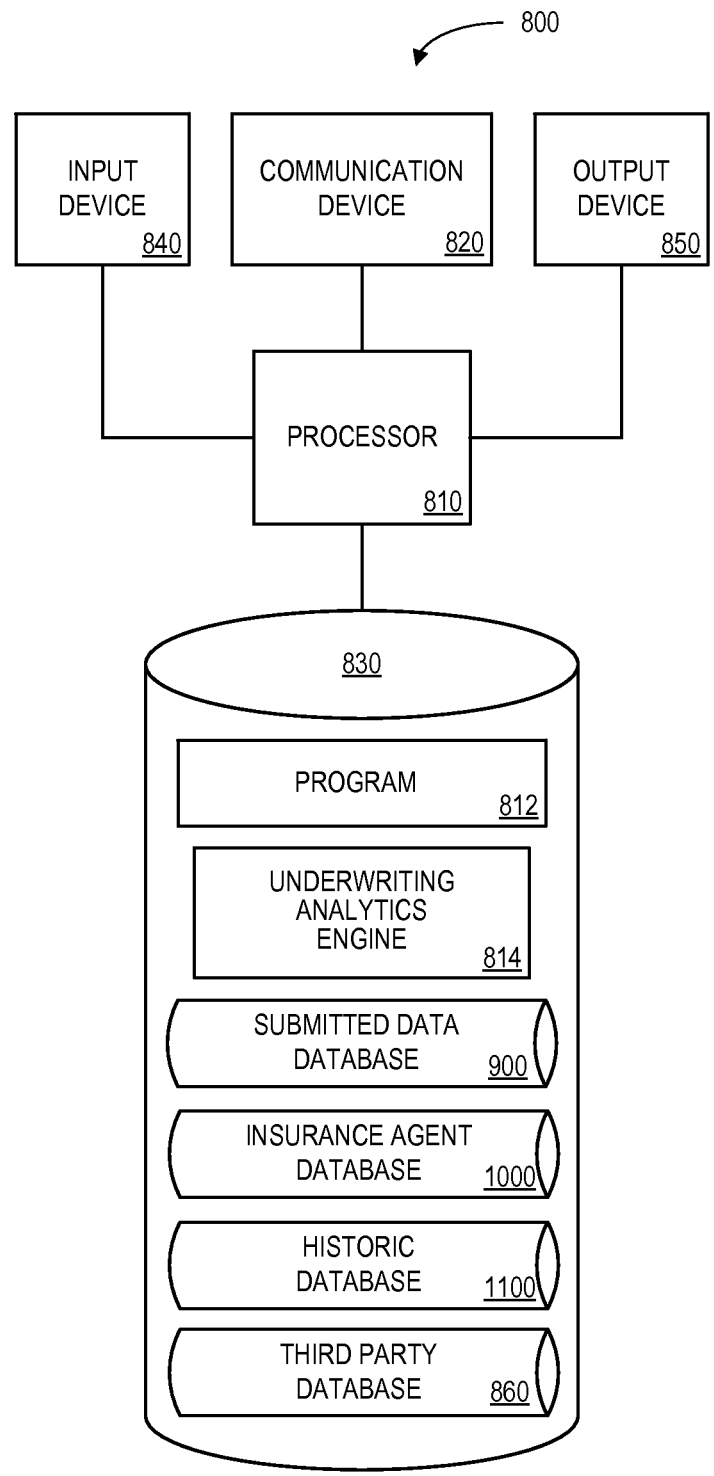
FIG. 8 is an example of an underwriting analytics platform according to some embodiments.

Note that embodiments described herein may be implemented in any number of different ways. For example, FIG. 8 is a block diagram overview of an underwriting analytics platform 800 according to some embodiments. The underwriting analytics platform 800 may be, for example, associated with the system 100 of FIG. 1. The underwriting analytics platform 800 comprises a processor 810, such as one or more commercially available Central Processing Units (CPUs) in the form of one-chip microprocessors, coupled to a communication device 820 configured to communicate via a communication network (not shown in FIG. 8). The communication device 820 may be used to communicate, for example, with one or more remote agent devices. The underwriting analytics platform 800 further includes an input device 840 (e.g., a mouse and/or keyboard to enter rule and/or model adjustments) and an output device 850 (e.g., a computer monitor to display reports and/or aggregated results to an administrator).

The processor 810 also communicates with a storage device 830. The storage device 830 may comprise any appropriate information storage device, including combinations of magnetic storage devices (e.g., a hard disk drive), optical storage devices, mobile telephones, vehicle computers, and/or semiconductor memory devices. The storage device 830 stores a program 812 and/or underwriting analytics engine 814 for controlling the processor 810. The processor 810 performs instructions of the programs 812, 814, and thereby operates in accordance with any of the embodiments described herein. For example, the processor 810 may receive, from a remote insurance agent via the communication device 820, insurance data submitted via an electronic quoting and submission system. The processor 810 may then automatically analyze the submitted insurance data based at least in part on information stored in a historic underwriting analytics database and/or behavioral information associated with the insurance agent. Potentially inaccurate insurance data submitted by the insurance agent may then be identified based on the analysis. According to some embodiments, a plurality of potentially inaccurate insurance data values may be used by the processor 810 to flag the submitted insurance data, the insurance agent, one or more input portions of the electronic quoting and submission system, and/or an insurance class of business.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the underwriting analytics platform 800 from another device; or (ii) a software application or module within the underwriting analytics platform 800 from another software application, module, or any other source.

In some embodiments (such as shown in FIG. 8), the storage device 830 stores a submitted data database 900 (described with respect to FIG. 9), an insurance agent database 1000 (described with respect to FIG. 10), and a historic database 1100 (described with respect to FIG. 11). According to some embodiments, the storage device 830 further stores a third party database 860. The third party database 860 may, for example, be associated with Experian® information, a Customer Relationship Management (CRM), content management system and/or a salesforce automation application. Examples of some of the databases that may be used in connection with the underwriting analytics platform 800 will now be described in detail with respect to FIGS. 9 through 11. Note that the databases described herein are examples, and additional and/or different information may be stored therein. Moreover, various databases might be split or combined in accordance with any of the embodiments described herein.

Referring to FIG. 9, a table is shown that represents the submitted data database 900 that may be stored at the underwriting analytics platform 800 according to some embodiments. The table may include, for example, entries identifying requests submitted by agents in connection with insurance policies. The table may also define fields 902, 904, 906, 908, 910 for each of the entries. The fields 902, 904, 906, 908, 910 may, according to some embodiments, specify: a policy identifier 902, an agent identifier 904, an insurance category 906, a business classification 908, and a flag indication 910. The information in the submitted data database 900 may be created and updated, for example, whenever data is submitted via remote agent devices.

The policy identifier 902 may be, for example, a unique alphanumeric code identifying information submitted by an insurance agent (e.g., in connection with a quote request for an insurance policy application). The agent identifier 904 might indicate the agent who submits the data and the insurance category 906 might indicate the type of insurance being applied for by the agent. By way of example only, the submitted data database 900 of FIG. 9 illustrates business classification 908 as the information being submitted. The business classification 908 might be based on, for example SIC codes. The flag indication 910 might identify some of the entries in the table as being potentially inaccurate.

Consider, for example, the first three entries in the table associated with policy identifiers P101 through P103, all received from agent A101. In this case, all entries were assigned a business classification 908 of "other." As a result, the underwriting analytics process generated a flag 910 (e.g., because that may be unusually high rate of use for that business classification). As other examples, the entry associated with policy identifier P106 has been flagged because the age of the fleet was changed four times during the data entry process, while the entry associated with policy identifier P107 has been flagged because too many cars in a commercial fleet were submitted with clear Motor Vehicle Records (MVRs).

Figure 10:
FIG. 10 is a tabular portion of an insurance agent database according to some embodiments.

Referring to FIG. 10, a table is shown that represents the insurance agent database 1000 that may be stored at the underwriting analytics platform 800 according to some embodiments. The table may include, for example, entries identifying insurance agents who have submitted insurance data. The table may also define fields 1002, 1004, 1006, 1008, 1010 for each of the entries. The fields 1002, 1004, 1006, 1008, 1010 may, according to some embodiments, specify: an insurance agent identifier 1002, a policy identifier 1004, areas of concern 1006, a plan of action 1008, and a status 1010. The information in the insurance agent database 1000 may be created and updated, for example, whenever information about an insurance agent changes.

The insurance agent identifier 1002 may be, for example, a unique alphanumeric code identifying an insurance agent who has submitted insurance data (and may be based on, or associated with, the insurance agent identifier 904 described with respect to FIG. 9). The policy identifier 1004 may be, for example, a unique alphanumeric code identifying information submitted by an insurance agent in connection with a quote request for an insurance policy application (and may be based on, or associated with, the policy identifier 902 described with respect to FIG. 9).

The areas of concern 1006 might, for example, indicate types of information that that agent frequent submits in an inaccurate manner and/or other behaviors that may need to be corrected. The plan of action 1008 might indicate what steps will be, or have been, taken to reduce inaccurate information in future submissions from that agent. The status 1010 might, for example, indicate when the associated plan of action 1008 should be complete, that it is in process, or that it has been completed (e.g., a warning has been "issued").

Referring to FIG. 11, a table is shown that represents the historic database 1100 that may be stored at the underwriting analytics platform 800 according to some embodiments. The table may include, for example, entries identifying parameters that are received from insurance agents. The table may also define fields 1102, 1104, 1106, 1108, 1110 for each of the entries. The fields 1102, 1104, 1106, 1108, 1110 may, according to some embodiments, specify: a parameter identifier 1102, a flag rate 1104, areas of concern 1106, a trend analysis 1108, and modeling information 1110. The information in the historic database 1100 may be created and updated, for example, whenever insurance agents submit insurance data and/or submitted data is analyzed.

The insurance parameter 1102 may be, for example, a unique alphanumeric code identifying a type of information that is provided by insurance agents. The flag rate 1104 might indicate how often that information is flagged as being potentially inaccurate. For example, 2% of received values associated with the information identified as insurance parameter 1102 "PAR_105" are flagged as being potentially inaccurate. The areas of concern 1106 may indicate why an underwriting analytics process flags the parameter as inaccurate, and a trend analysis 1108 might indicate, for example, whether the flag rates are decreasing, steady, or increasing. The modeling information 1110 might indicate, according to some embodiments, how the parameters should be used in the future to identify potentially problematic policies, agencies, or types of business. Moreover, different insurance parameters 1102 might be assigned different weights in connection with the modeling information 1110. For example, the insurance parameter associated with "PAR_101" has been flagged at a steady 1% rate and may there be a reliable predictor of inaccurate information (and thus receive a relatively strong weight of 0.3). The insurance parameter associated with "PAR_103," however, is flagged at a relatively high rate of 5% which has recently been increasing as indicated by the trend analysis 1108. As a result, that insurance parameter is not used in the model (and, in fact, the wording of the question associated with that parameter is being reviewed).

Although specific examples of information that might be provided in a historic underwriting analysis database have been provided herein (e.g., in connection with the submitted data database 900, the agent database 1000, and/or the historic database 1100), note that many other types of information might be used in addition to, or instead of, the examples provided. For example, a historic underwriting analysis database may store information about an agency profile and whether or not that information is substantially different as compared to other agency profiles. For example, does an agent more frequently request backdated coverage, have a relatively high declination rate, or a relatively high new business cancellation rate? Any of the factors might be used in connection with a historic underwriting analysis database according to embodiments described herein.

As other example, the classification of a business may be associated with various types of information in a historic underwriting analysis database. For example, how often an agent changes classifications, whether or not agent overuses certain class codes (e.g., consultant, general office, or other), and whether the agent often submits risks with an Experian® SIC mismatch might be stored in the historic underwriting analysis database. Note that an even more detailed level of information might be associated with the historic underwriting analysis database. Consider, for example, an insurance parameter that indicates how long a potential insured has been in business. In addition an insurance provider considers a new business as being a potentially greater risk, and, as a result, requires more data when a company has been in business for less than three years. In this case, a historic underwriting analysis database might indicate that a particular agent rarely submits requests for companies in business less than three years (e.g., as compared to other agents in the same geographic area). Similarly, an agent might submit automobile insurance polices with an unusual class or distribution of vehicles.

As still other examples, a historic underwriting analysis database might indicate if an agent is associated with endorsements that frequently change exposure within 90 days of issuance or often submits workers compensation policies that have an average wage outside of that which is expected for the class of business. Similarly, the historic underwriting analysis database might record if the construction type for a particular submission (or set of submission over time) is not typical for a given geographic area (e.g., a downtown area of a city). Similarly, the historic underwriting analysis database might record when an agent submits a risk with a potentially inaccurate building age or building type.

Other agent behaviors that might be stored in or detect by a historic underwriting analysis database include whether an agent frequently request pricing outside of tolerance, whether an agent changes underwriting question answers to obtain a better price, and/or whether the agent has any claim risk alerts, frequent premium audit risk alerts, or an instance of a very large discrepancy. Moreover, an agent with a validation rate outside of an expected range of validation rates may be detected using information in a historic underwriting analysis database.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with insurance products. Note, however, that other types of insurance and related products may also benefit from the invention. For example, embodiments of the present invention may be used to flag potentially inaccurate data for financial, medical, educational, and other types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A data analytics system, comprising:
an electronic quote submission system configured to receive, via a communications network, a plurality of policy application data submissions for potential customers from remote agent devices, each of the policy application data submissions including (i) revisions data indicative of one or more revisions of submitted policy application data made by a corresponding remote agent during entry of data for each of the policy application data submissions, (ii) backdating data indicative of requests for backdated coverage; (iii) cancellation data indicative of policy cancellations; and (iv) classification data indicative of classification changes; and
a policy analytics platform coupled to the electronic quote submission system and configured to:
store, in a data storage device, the plurality of policy application data submissions in a database of historical underwriting data;
continuously analyze the historical underwriting data to identify trends in the database of historical underwriting data;
receive, from the electronic quote submission system, a policy application data submission for a potential customer from a remote agent device associated with an agent;
receive, from the data storage device, agent behavioral data corresponding to the remote agent in connection with other policy applications submitted by the remote agent through the electronic quote submission system, wherein the agent behavioral data includes the revisions data, the backdating data, the cancellation data, and the classification data;
automatically analyze the submitted policy application data based at least in part on the agent behavioral data corresponding to the remote agent and the identified trends in the historical underwriting data;
identify, based on the analysis, potentially inaccurate policy application data submitted by the remote agent in the submitted policy application data;

responsive to identification of the potentially inaccurate policy application data submitted by the remote agent, generate a flag corresponding to at least one of the input portion of the electronic quote submission system, and a class of business;

responsive to identification of a plurality of potentially inaccurate policy application data submitted by the remote agent, generate one or more flags corresponding to the remote agent based on application of: (i) a revisions rule threshold, (ii) a cancellations rule threshold, (iii) a backdating rule threshold, and (iv) a classification change rule threshold, to the plurality of potentially inaccurate policy application data; and render for display on an administrator response device a real-time graphical display which identifies the one or more flags generated in relation to potentially inaccurate policy application data and which displays a recommendation for addressing each of the one or more flags, thereby permitting review of the potentially inaccurate policy data before generation of an underwriting determination.

2. The system of claim 1, wherein the electronic quote submission system is configured to receive one of: (i) a policy application being submitted for a quote or approval, (ii) a previously issued policy, and (iii) a plurality of previously issued policies.

3. The system of claim 1, wherein the electronic quote submission system is configured to receive submitted policy application data for at least one of: (i) a commercial small business owner's policy, and (ii) a workers compensation policy.

4. The system of claim 1, wherein the electronic quote submission system is adapted to collect behavioral data associated with the remote agent.

5. The system of claim 1, further comprising:
a response device adapted to receive a signal associated with the potentially inaccurate data and to maintain a queue of actions to be taken in connection with the potentially inaccurate data.

6. The system of claim 1, wherein the memory storing program instructions executable by the computer processor to receive agent behavioral data further comprises the memory storing program instructions executable by the computer processor to receive one or both of (1) data relating to a set of answers submitted by the remote agent over a period of time in connection with the other submitted policy applications, and (2) data relating to endorsements requested by the remote agent after one or more of the other submitted policy applications has been submitted or issued.

7. The system of claim 1, wherein the policy analytics platform is further configured to generate modeling information indicative of rule weighting and whether to employ certain rules in generation of one or more flags based at least in part on steadiness of rate of flagging.

8. A computer-implemented method, comprising:
receiving, by an electronic quote submission system via a communications network, a plurality of policy application data submissions for potential customers from remote agent devices, each of the policy application data submissions including (i) revisions data indicative of one or more revisions of submitted policy application data made by a corresponding remote agent during entry of data for each of the policy application data submissions, (ii) backdating data indicative of requests for backdated coverage; (iii) cancellation data indicative of policy cancellations; and (iv) classification data indicative of classification changes; and storing, by a policy analytics platform coupled to the electronic quote submission system, in a data storage device, the plurality of policy application submissions in a database of historical underwriting data;

continuously analyzing, by the policy analytics platform, the historical underwriting data to identify trends in the database of historical underwriting data;

receiving, by the policy analytics platform from the electronic quote submission system, a policy application data submission for a potential customer from a remote agent device associated with an agent;

receiving, by the policy analytics platform from the data storage device, agent behavioral data corresponding to the remote agent in connection with other policy applications submitted by the remote agent through the electronic quote submission system, wherein the agent behavioral data includes the revisions data, the backdating data, the cancellation data, and the classification data;

automatically analyzing, by the policy analytics platform, the submitted policy application data based at least in part on the agent behavioral data corresponding to the remote agent and the identified trends the historical underwriting data;

identifying, by the policy analytics platform based on the analysis, potentially inaccurate policy application data submitted by the remote agent in the submitted policy application data;

responsive to identification of the potentially inaccurate policy application data submitted by the remote agent, generating, by the policy analytics platform, a flag corresponding to at least one of the input portion of the electronic quote submission system, and a class of business;

responsive to identification of a plurality of potentially inaccurate policy application data submitted by the remote agent, generating, by the policy analytics platform, one or more flags corresponding to the remote agent based on application of: (i) a revisions rule threshold, (ii) a cancellations rule threshold, (iii) a backdating rule threshold, and (iv) a classification change rule threshold, to the plurality of potentially inaccurate policy application data; and rendering, by the policy analytics platform for display on an administrator response device, a real-time graphical display which identifies the one or more flags generated in relation to potentially inaccurate policy application data and which displays a recommendation for addressing each of the one or more flags, thereby permitting review of the potentially inaccurate policy data before generation of an underwriting determination.

9. The method of claim 8, wherein receiving the submitted policy application data comprises receiving the submitted policy application data from a party entering information on behalf of the agent.

10. The method of claim 8, wherein receiving the submitted policy application data comprises receiving the submitted policy application data for a renewal of a previously issued policy.

11. The method of claim 8, further comprising storing in the historic underwriting analytics database information comprising at least one of: (i) agent large loss information, (ii) an audit team input, and (iii) a field agency assessment.

12. The method of claim 8, wherein generating the flag further comprises generating the flag based on a rule threshold for at least one of: (i) hard stops, (ii) exposures, (iii) pricing, and (iv) large loss rates.

13. The method of claim 8, further comprising transmitting agent recommendation in connection with the flag, the recommendation being at least one of: (i) no action being required for an agent, (ii) an agent audit recommendation, (iii) a monitor status for an agent, (iv) an increase in an agent quality assurance process, (v) a verbal or written agent warning, (vi) an agent training plan, (vii) an agent action plan, and (viii) a financial penalty to an agent.

14. The method of claim 8, wherein the electronic quote submission system includes a plurality of input portions and further comprising flagging, based upon the data about a plurality of potentially inaccurate data values, at least one of the input portions.

15. The method of claim 14, wherein the input portion comprises a Standard Industrial Classification ("SIC") code question or selection.

16. The method of claim 8, further comprising flagging, responsive to identification of a plurality of potentially inaccurate data values, a class of business.

17. The method of claim 8, wherein receiving the submitted policy application data comprises receiving submitted policy application data comprising at least one of: (i) an analysis in process, (ii) a monitor status, (iii) an open status, (iv) a delivered recommendation, and (v) an in progress recommendation.

18. The method of claim 8, wherein receiving the submitted policy application data comprises receiving the submitted policy application data for at least one of: (i) a commercial small business owner's policy, and (ii) a workers compensation policy.

19. The method of claim 8, further comprising storing, in the historic underwriting analytics database, at least one of: (i) leading indicators of misinformation, (ii) agency profile data, (iii) declination information, (iv) endorsement activity, (v) exposure discrepancy, (vi) hard stop overrides, (vii) large loss and unacceptable risk values, (x) risk alerts, and (xi) third-party data.

20. The method of claim 8, wherein continuously analyzing the historical underwriting data to identify trends in the database of historical underwriting data comprises periodically performing an analysis on the information stored in the historic underwriting analytics database to determine at least one of: (i) a trigger, (ii) an unusual distribution or frequency of negative attributes, (iii) a tolerance, and (iv) a threshold.

21. The method of claim 20, wherein the periodic analysis comprises at least one of: (i) scoring data, (ii) data mining, (iii) outlier identification, (iv) weighting factor generation, and (v) a recent activity analysis.

22. A non-transitory computer-readable medium storing computer executable instructions, which, when executed by a computer processor, cause the computer processor to:

receive a plurality of policy application data submissions for potential customers from remote agent devices, each of the policy application data submissions including (i) revisions data indicative of one or more revisions of submitted policy application data made by a corresponding remote agent during entry of data for each of the policy application data submissions, (ii) backdating data indicative of requests for backdated coverage; (iii) cancellation data indicative of policy cancellations; and (iv) classification data indicative of classification changes; and store the plurality of policy application submissions in a database of historical underwriting data;

continuously analyze the historical underwriting data to identify trends in the database of historical underwriting data;

receive, from a remote agent, a policy application data submission for a potential customer via an electronic quoting and submission system, receive, from a historic underwriting analytics database, agent behavioral data corresponding to the remote agent in connection with other policy applications submitted by the remote agent, wherein the agent behavioral data includes the revisions data, the backdating data, the cancellation data, and the classification data;

automatically analyze the submitted data based at least in part on the insurance agent behavioral data corresponding to the remote agent and the identified trends in the historical underwriting data;

identify, based on the analysis, potentially inaccurate data submitted by the remote agent in the submitted data;

responsive to identification of the potentially inaccurate insurance policy application data submitted by the remote agent, generate a flag corresponding to at least one of the input portion of the electronic quoting and submission system, and a class of business;

responsive to identification of a plurality of potentially inaccurate policy application data submitted by the remote agent, generate one or more flags corresponding to the remote agent based on application of: (i) a revisions rule threshold, (ii) a cancellations rule threshold, (iii) a backdating rule threshold, and (iv) a classification change rule threshold, to the plurality of potentially inaccurate policy application data; and render for display on an administrator response device a real-time graphical display which identifies the one or more flags generated in relation to potentially inaccurate policy application data and which displays a recommendation for addressing each of the one or more flags, thereby permitting review of the potentially inaccurate policy data before generation of an underwriting determination.

23. The medium of claim 22, wherein the instructions which cause the computer processor to receive submitted policy application data comprises instructions which cause the computer processor to receive submitted policy application data for a renewal of a previously issued policy.

24. The medium of claim 23, wherein the instructions which cause the computer processor to receive submitted policy application data comprises instructions which cause the computer processor to receive submitted policy application data for at least one of: (i) a commercial small business owner's policy, and (ii) a workers compensation policy.

* * * * *